(12) United States Patent
Edwards (10) Patent No.: US 8,624,442 B2
(45) Date of Patent: Jan. 7, 2014

(54) ILLUMINATED PUSHBUTTON SWITCH WITH EMBEDDED INTERFACE AND DRIVER LOGIC

(75) Inventor: Steven A. Edwards, North Richland Hills, TX (US)

(73) Assignee: Aerospace Optics, Inc., Fort Worth, TX (US)

( * ) Notice: Subject to any disclaimer, the term of this patent is extended or adjusted under 35 U.S.C. 154(b) by 187 days.

(21) Appl. No.: 13/199,444

(22) Filed: Aug. 29, 2011

(65) Prior Publication Data

US 2012/0187861 A1 Jul. 26, 2012

Related U.S. Application Data

(63) Continuation-in-part of application No. 12/701,543, filed on Feb. 6, 2010, now Pat. No. 8,222,771.

(60) Provisional application No. 61/377,969, filed on Aug. 29, 2010, provisional application No. 61/207,016, filed on Feb. 6, 2009.

(51) Int. Cl.
*H01H 3/00* (2006.01)
(52) U.S. Cl.
USPC .......................................................... 307/139
(58) Field of Classification Search
USPC .......................................................... 307/139
See application file for complete search history.

(56) References Cited

U.S. PATENT DOCUMENTS

| | | | |
|---|---|---|---|
| 3,683,350 | A | 8/1972 | Shedenheim |
| 4,535,396 | A | 8/1985 | Guthrie |
| 4,592,003 | A | 5/1986 | Kobayashi et al. |
| 2005/0231946 | A1 | 10/2005 | Guthrie |

OTHER PUBLICATIONS

International Search Report issued on May 12, 2010 in connection with International Patent Application No. PCT/US2010/023423.
Written Opinion issued on May 12, 2010 in connection with International Patent Application No. PCT/US2010/023423.

*Primary Examiner* — Robert L. Deberadinis (57) ABSTRACT

Illuminated pushbutton switches are improved by replacing the traditional time delay relays, Boolean interface logic or driver components often incorporated within interface wiring and harnesses with a subminiature electronic logic module located within the illuminated pushbutton switch housing. This Logic Module provides numerous additional benefits beyond the standard illuminated push button switch by incorporating functional capability such as pulse timing, edge detecting or Boolean logic that allow the unit to replace external electro mechanical relays, diode logic, or time delay relays that are typical in current applications. These additional features provide enhancements by allowing lower size and weight, longer switch life, no electrical spikes, remote set and reset capability, display blinking, and high reliability electronic driver circuits that can drive modest electrical loads.

20 Claims, 9 Drawing Sheets

ILLUMINATED PUSHBUTTON SWITCH WITH EMBEDDED INTERFACE AND DRIVER LOGIC

CROSS-REFERENCE TO RELATED APPLICATION(S) AND CLAIM OF PRIORITY

This application claims priority to U.S. Provisional Patent Application Ser. No. 61/377,969 filed Aug. 29, 2010 and is a continuation-in-part of commonly assigned, U.S. patent application Ser. No. 12/701,543 filed Feb. 6, 2010 now U.S. Pat. No. 8,222,771 and entitled ILLUMINATED PUSHBUTTON SWITCH WITH ELECTRONIC LATCHING AND BLINKING FEATURE, which claims priority to commonly assigned U.S. Provisional Patent Application No. 61/207,016, filed Feb. 6, 2009, all of which are hereby incorporated by reference.

TECHNICAL FIELD

The present disclosure is directed, in general, to illuminated pushbuttons switches, and more specifically to implementing interface and driver logic within the housing for illuminated pushbutton switches, including logic for implementing electronic latching and blinking features for the illuminated pushbutton switch.

BACKGROUND

Illuminated pushbutton switches used in commercial and military aircraft, boats and other vehicles are fairly uniform in size across various commercial suppliers. The switches are usually a generally rectangular cuboid with a length of approximately 2.5 inches and an end face ranging from about 0.75×0.75 inches to 1.5×1.5 inches, including non-square configurations (e.g., 1.0×1.5 inches). These switches normally include a cap and a frame or body, collectively housing incandescent or light emitting diode (LED) illumination sources, optical filters, legend plates, snap action mechanical switches, connectors, driver circuits, and other components. Switch sizing is generally selected by the aircraft, boat or vehicle manufacturer based on compatability with existing designs, interoperability with on-board control systems, and space and/or weight considerations.

Normally the interface and drive logic for connecting illuminated pushbutton switches to control systems within the vehicle is external to the switch. A controller prompting illumination or responding to actuation of the switch is disposed somewhere in the vehicle, normally connected to multiple illuminated pushbutton switches. The interface provides circuits, for example, for stepping down the 14 or 28 volts (V) direct current (DC) voltage normally available in aircraft in order to implement voltage-controlled dimming.

Specialized applications involving illuminated pushbutton switches may require electronic interface and drive functions such that depressing the pushbutton switch initiates an action, a conditional action or a timed response. The functional operation can be initiated by receiving inputs from the switch or may be a signal received from a remote location. The interface logic signal or timing pulse results in a signal output that can then be used to energize the local illuminated switch or/or activate another unit such as an illuminated indicator or a remote interface within a different device. Such functionality may involve a plurality of illuminated pushbutton switches in differing locations all interfacing through the same interface or logic units, wherein a switch depressed at one location may be modified by the interface circuitry or driven by the local switch circuitry.

For example, within the realm of illuminated pushbutton switch usage, specialized applications are emerging requiring inclusion of latching, blinking or remote control functions to be included within the illuminated pushbutton switch housing. Such applications may require depressing the pushbutton switch to initiate a remote action request, activating switch functions from a remote location, energizing or blinking a local or remote display, and resetting the switch state automatically upon remote acknowledgement. Other applications may involve a plurality of illuminated pushbutton switches in differing locations, all controlling the same functions, wherein a switch depressed at one location must change the state of a switch or display at another location. Nearly all applications require the added safety feature of an automatic reset to a default state after loss of power.

Proposed designs may incorporate local latching and remote release functions through the use of internal electromagnetic holding coils, in some cases together with various electronic or electromechanical means to interrupt the holding coil current locally without remote intervention. Many of the proposed designs that rely upon an internal electromagnetic holding coil suffer from excessive power consumption, excessive heat, sensitivity to shock and physical jarring, electrical spikes, holding coil drop-out on low voltage, and low reliability. The internal holding coil also makes the resulting illuminated pushbutton switch substantially longer and heavier than standard models that do not incorporate a holding coil.

There is, therefore, a need in the art for improved implementation of interface and relay functions for pushbutton illuminated switches.

SUMMARY

Illuminated pushbutton switches are improved by replacing the traditional time delay relays, Boolean interface logic or driver components often incorporated within interface wiring and harnesses with a subminiature electronic logic module located within the illuminated pushbutton switch housing. This Logic Module provides numerous additional benefits beyond the standard illuminated push button switch by incorporating functional capability such as pulse timing, edge detecting or Boolean logic that allow the unit to replace external electro mechanical relays, diode logic, or time delay relays that are typical in current applications. These additional features provide enhancements by allowing lower size and weight, longer switch life, no electrical spikes, remote set and reset capability, display blinking, and high reliability electronic driver circuits that can drive modest electrical loads. In particular, within an illuminating pushbutton switch, an electronic circuit replaces an electromagnetic holding coil for latching or releasing a state of the illuminated pushbutton switch, and further provides blinking functionality. The electronic circuit includes inputs receiving set, reset and toggle control signals, outputs delivering open, closed and blink control signals, latch logic controlled by the set and reset control signals and delivering signals maintaining the illuminated pushbutton switch in either an open or closed state, and a frequency divider and oscillator coupled together to deliver a blink control signal. The electronic circuit fits within the illuminated pushbutton switch housing in space sized to hold two snap action switching devices without increase in the length, weight or mounting depth of the illuminated pushbutton switch. The inputs and outputs are coupled to external pins from the illuminated pushbutton switch and may be remotely controlled.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1A:
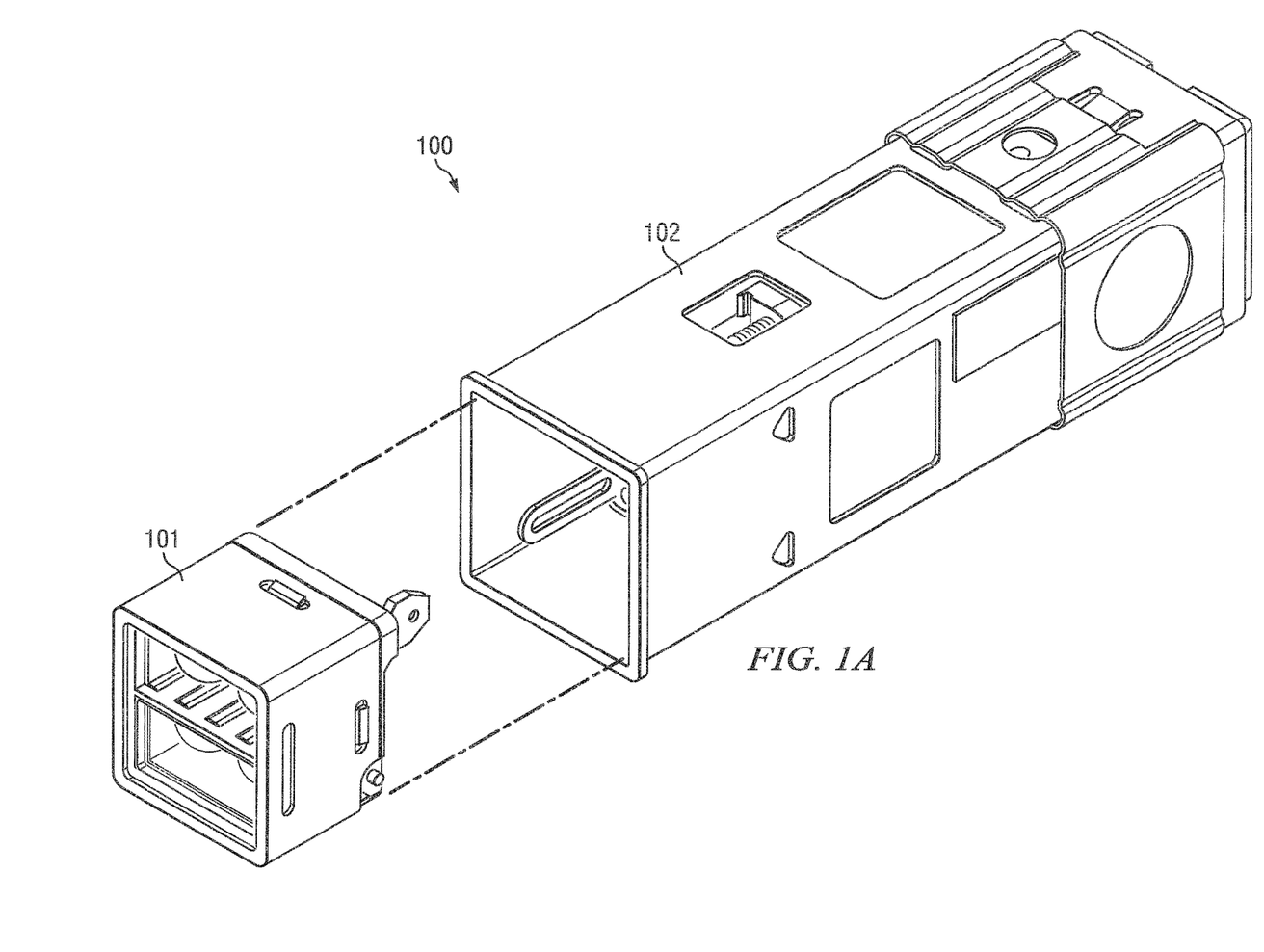
FIGS. 1A, 1B and 1C are exploded perspective views of a pushbutton illuminated switch (or components thereof) with four snap-action switch modules.
Figure 1B:
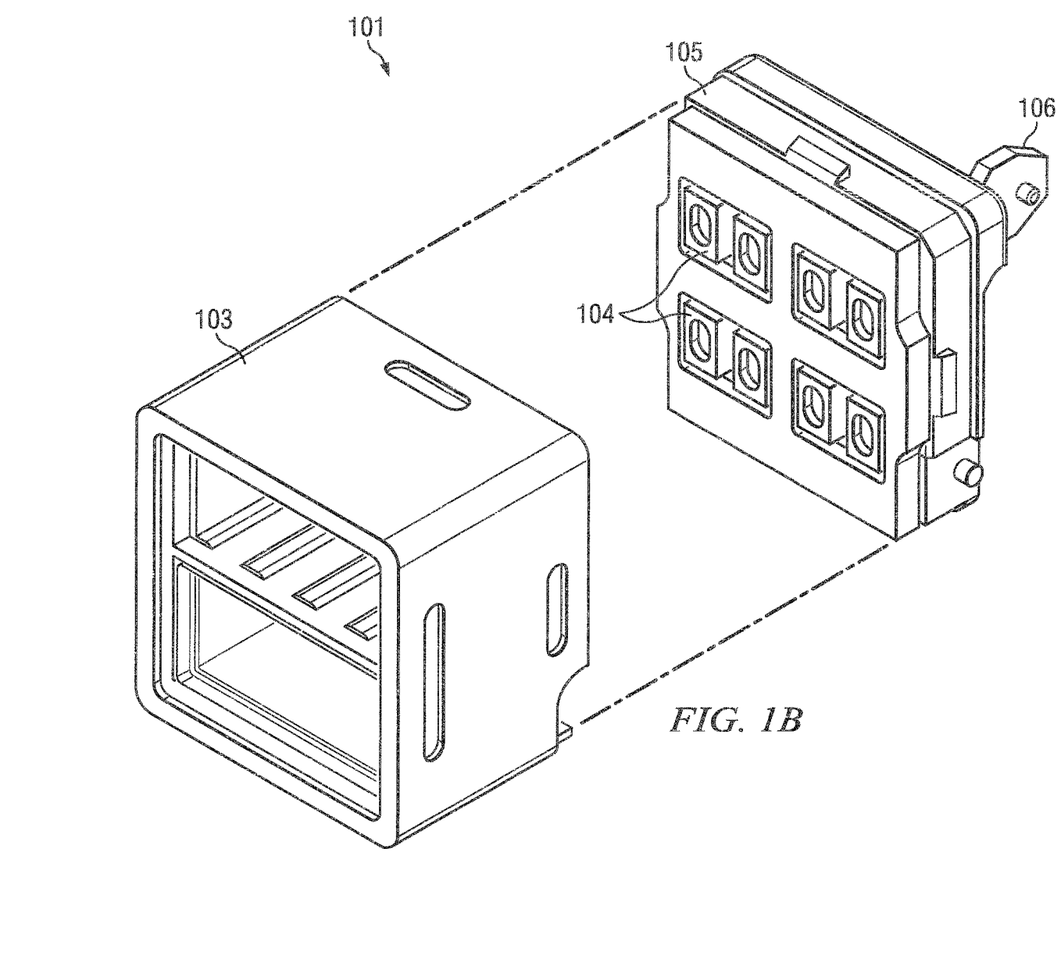
Figure 1C:
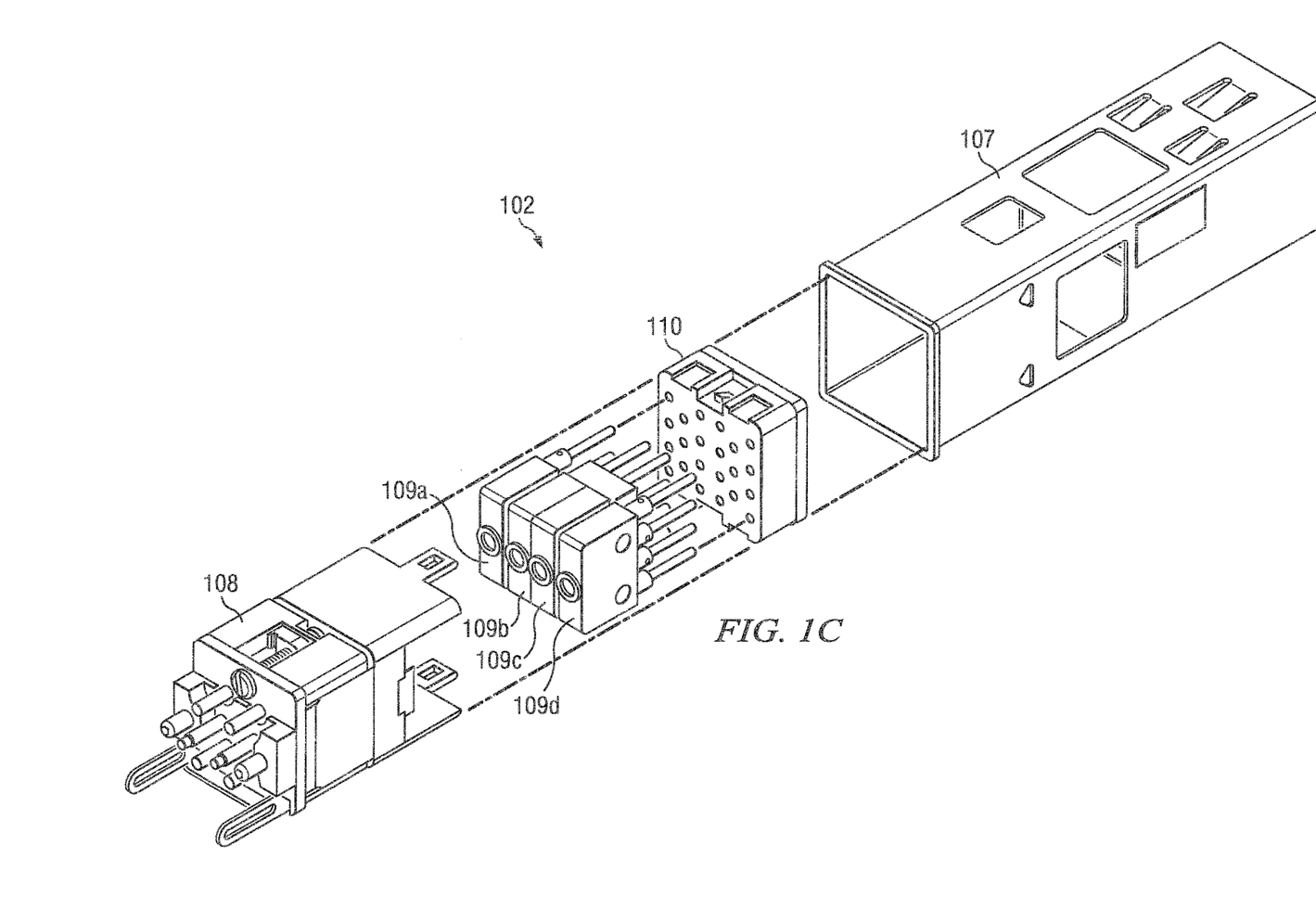

FIGS. 1A, 1B and 1C are exploded perspective views of a pushbutton illuminated switch (or components thereof) (or components thereof) with four snap-action switch modules. The pushbutton switch 100 includes a switch cap 101 and a switch body 102. The switch cap 101 is located at the front of the switch 100 and is received by the switch body 102. The switch cap 101 includes a switch cap housing 103 receiving an array 104 of surface mount diode (SMD) light emitting diodes (LEDs). The 2×4 LED array 104 depicted in FIG. 1B has two rows of four LEDs arranged to illuminate four quadrants of a face plate (not shown) on the front of switch cap body 103, with two LEDs (a 1×2 subarray) per quadrant. In other embodiments, the array 104 may include sixteen LEDs arranged in an overall 4×4 array, with 2×2 subarrays illuminating each of four quadrants of the face plate.

The LEDs are mounted over a switch cap back plate 105 and are connected to an electrical driving circuit (not visible in FIG. 1B) mounted on the switch cap back plate 105. A member 106 for mechanical latching and release of the pushbutton switch when the switch cap 101 is depressed within the switch body 102 protrudes from the rear of switch cap back plate 105. Electrical connections (not shown) to the driving circuit are also exposed on the rear surface of switch cap back plate 105. The structure depicted and described is consistent with the design of the switch bodies for the models 4 pole 95, R2 and LR3 pushbutton illuminated switches sold by Aerospace Optics, Inc. of Fort Worth, Tex. The switch bodies have dimensions of less than 1.5×1.5×3 inches, typically either about 0.75×0.75 or about 1×1 and about 2.5 inches in length. Each of the circuits and applications disclosed herein may be housed within such switches in the manner described in further detail below.

In some embodiments, switch body 102 includes a housing 107 receiving a mechanical and electrical subsystem 108 for mechanical latching and release of the pushbutton switch 100, for transmitting electrical signals to the driving circuit, and for transmitting mechanical forces to actuate four-pin snap-action switching devices 109a through 109d. Pins for the switching devices 109a through 109d are received by mounting block 110 and provide electrical switching by connections of the pins to external signal sources and/or through the subsystem 108 to the driving circuit. The pins of devices 109a through 109d extend through the mounting block 110 and may be connected at the rear of pushbutton switch 100 to external signals, to each other, and/or through subsystem 108 to the driving circuit.

Those skilled in the art will recognize that the complete structure and operation of a pushbutton switch of the type normally used in avionics is not depicted or described herein. Instead, for simplicity and clarity, only so much of the structure and operation of a pushbutton switch as is necessary for an understanding of the present disclosure is depicted and described. For example, filters between the LEDs and the switch cap face plate allow legends on the switch cap face plate to be illuminated in different colors as disclosed in U.S. Pat. No. 6,653,798, which is incorporated herein by reference. Driving circuits mounted on flexible substrates may be mounted within the switch cap to drive each subarray of LEDs, providing voltage-controlled dimming as described in U.S. Pat. No. 6,323,598, which is also incorporated herein by reference. Numerous other features not depicted or described herein are or may be included within pushbutton switch 100.

Figure 1D:
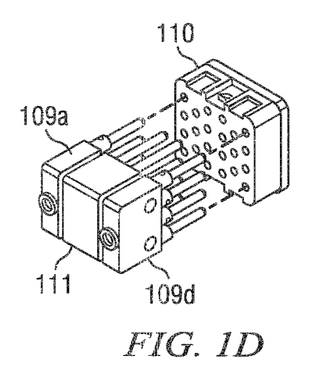
FIGS. 1D and 1E are perspective views illustrating incorporation of an embedded interface and driver logic module into the pushbutton illuminated switch of FIGS. 1A-1C.
Figure 1E:
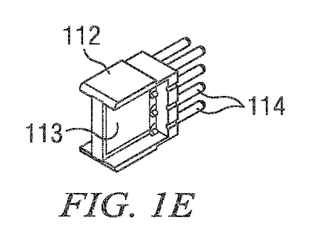

FIGS. 1D and 1E are perspective views illustrating incorporation of an embedded configurable pulse timer interface module within the pushbutton illuminated switch of FIGS. 1A-1C. As shown in FIG. 1D, an electronic module 111 is inserted in place of snap-action switch modules 109b and 109c, with pins received by mounting block 110. FIG. 1E depicts a mounting frame 112 on which integrated electronic circuitry may be mounted, within one of the recesses 113. The electronic module 111 is coupled to a plurality of interface pins 114 (eight in the exemplary embodiment) each extending from the electronic circuitry through a portion of the mounting frame 112 to an endpoint and configured to pass through additional frames or housings (not shown) and engage additional electronic circuitry (not shown), in the same manner as pins for switching devices 109b and 109c. This approach provides the added functionality of the electronic module 111 with no increase in length, weight or mounting depth while retaining two uncommitted snap-action switching devices 109a and 109d that can be used to interact with the electronic module 111 or control other system functions.

Figure 2:
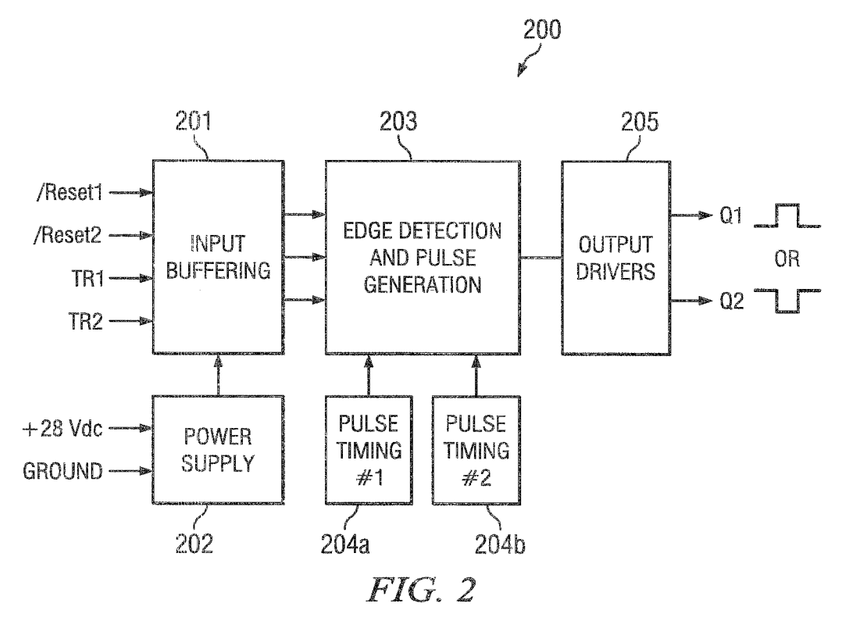
FIG. 2 is a high level functional block diagram of an embedded configurable pulse timer interface module within the pushbutton illuminated switch of FIGS. 1A-1C, contained within electronic module 111.
Figure 3:
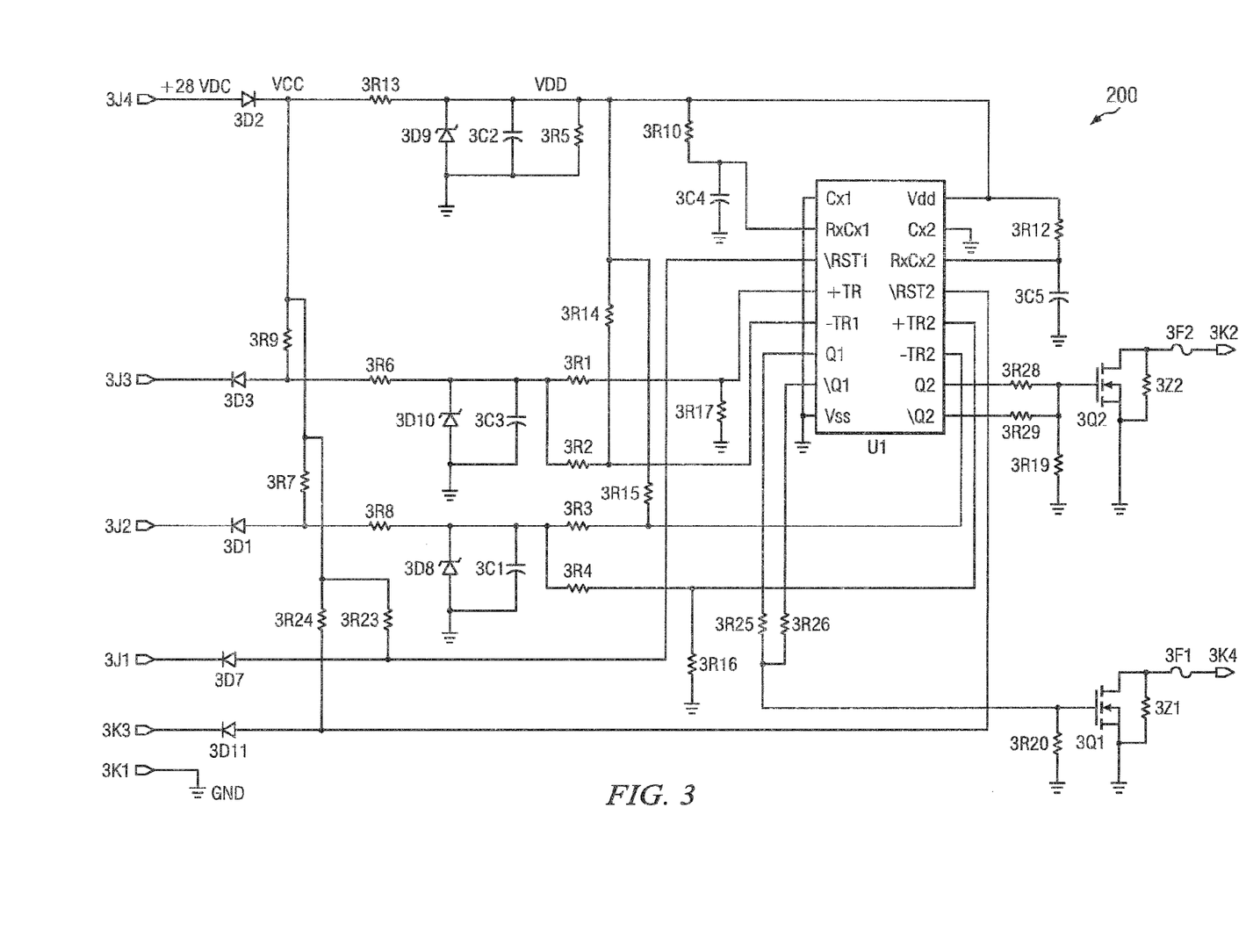
FIG. 3 is a circuit diagram for the embedded configurable pulse timer interface module of FIG. 2.

FIG. 2 is a high level functional block diagram of an embedded configurable pulse timer interface module within the pushbutton illuminated switch of FIGS. 1A-1C, contained within electronic module 111. FIG. 3 is a circuit diagram for the embedded configurable pulse timer interface module of FIG. 2. Electronic circuitry 200 within the configurable pulse timer interface module includes several functional units: input buffering unit 201; logic power supply unit 202; edge detection and pulse generation unit 203; pulse timing units 204a and 204b; and output drivers unit 205. A pulse timer interface module contained within a push button switch provides a number of benefits over traditional illuminated push button switches and timed relays by combining multiple functions into one unit. The pulse timer interface module can replace traditional electro-mechanical hold relays with an internal timed output that may be used in a plurality of different ways, such as to provide timed illumination to the illuminated push button switch or to drive external devices such as a horn or buzzer. In addition, the pulse timer interface module enables a latched condition to provide a momentary pulsed output, a capability that permits either a local or remote latching of a steady state input from an alternate action type switch to generate a pulsed time output on any positive or negative level transition. The pulse timer interface module thus adds a capability that does not currently exist within existing push button illuminated switches by allowing an alternate action illuminated push button switch to produce both a latched steady state output and a momentary pulsed output from the same unit. The latched condition is produced by the mechanical latch and mechanical contacts of the switch and the momentary pulse is produced by the pulse timer unit. The electronic nature of the pulse timer provides the additional feature of remote disable or reset using the reset inputs. When the reset lines are held at ground the pulse output is disabled causing these inputs to perform an enable/disable capability, an enhancement over a traditional fully mechanical push button illuminated switch that cannot be remotely enabled or disabled with an electronic signal.

TABLE I below contains the pulse timer logic signals and functions for the configurable pulse timer interface module of FIG. 2, while TABLE II describes the logic input and output functions:

TABLE I

| SIGNAL NAME | 4-POLE HOUSING PIN | LOGIC FUNCTION | COMMENTS |
|---|---|---|---|
| /RESET1 | J1 | Input: Low = Resets and disables pulse outputs when held low. | |
| /RESET2 | K3 | Input: Low = Resets and disables pulse outputs when held low. | |
| TR2 | J2 | Input: Triggers pulse on Q2 outputs from a transition. See function table below. | TR inputs will be factory configured as TR+, TR− or TR+/− |
| TR1 | J3 | Input: Triggers pulse on Q1 outputs from a transition. See function table below. | TR inputs will be factory configured as TR+, TR− or TR+/− |
| +28 VDC | J4 | Power | |
| Ground | K1 | Ground | |
| Q1 | K4 | Output: H: Default = grounded. Becomes high impedance for length of pulse L: Default = high impedance. Becomes grounded for length of pulse | |
| Q2 | K2 | Output: H: Default = grounded. Becomes high impedance for length of pulse L: Default = high impedance. Becomes grounded for length of pulse | High(H) or Low (L) output options are selected and adjusted at time of manufacture in the factory |

TABLE II

| Inputs | | | | Outputs | |
|---|---|---|---|---|---|
| /RESET | TR+ | TR− | TR+/− | H | L |
| L | L→H | H→L | L→H or H→L | Output transitions from ground to high impedance for the specified pulse period | Output transitions from high impedance to ground for the specified pulse period |
| L | X | X | X | Output is grounded. | High impedance (open drain). |

The pulse timer interface module 200 has a total of eight (8) interface pins, four interface pins devoted to logic input signals TR1, TR2, /RESET1 and /RESET2 and two interface pins devoted to logic output signals Q1 and Q2. Two additional interface pins are devoted to power: +28 VDC and Ground.

The pulse timer interface module 200 includes a monostable multi-vibrator integrated circuit 3U1 with functional operation as described in TABLE I and connected as shown in FIG. 3. The logic power supply 202 for mono-stable multi-vibrator 3U1 (e.g., CD14538B) is provided by a zener shunt regulator 3D9 from the +28 VDC Power input 3J4 and ground connection at input 3K1. Due to the low operating current of the complementary metal-oxide-semiconductor (CMOS) circuitry, a current limiting resistor 3R13 has been assigned the value of 10 kilo-Ohms (KΩ) in order to limit the current of any electromechanical contact (EMC) or other voltage transient on the +28 VDC power pin.

Input buffering 201 provides transient suppression and voltage regulation on the +7.5 VDC logic power supply by diode 3D10 and capacitor 3C3 filtering of input 3J3 and logic transients. Because the logic power supply is a simple shunt voltage regulator, the pulse timer interface module 200 can operate over a wide input voltage range from below +10 VDC to in excess of +30 VDC.

Each logic input 3J1, 3J2, 3J3 and 3K3 to the pulse timer interface module 200 includes input filter circuitry within the input buffering 201 designed to protect the integrated circuits from voltage transients such as electromechanical contact bounce and to shift the 28 VDC logic level to a 7.5 VDC logic level. The EMC protection, voltage transient protection and logic level shift function is accomplished with resistors 3R1, 3R2, 3R3, 3R4, 3R11 and 3R25 and zener diodes 3D5, 3D8, 3D10 and 3D12. Furthermore, CMOS latch-up on extreme transients such as lightning or conducted electromagnetic pulse (EMP) is prevented by clamping the logic inputs at 0.5 VDC below the logic power supply voltage. Suppression of electromechanical contact bounce is provided by resistor capacitor time constant on all inputs using resistors. /RESET1 ("/RST1") and /RESET2 ("/RST1") input 3J1 and 3K3 time constants also guarantee a default power-up state for mono-stable multi-vibrator 3U1 because the power-up time constant of these components is substantially longer than that of both the logic power supply and TR1 and TR2. A default static logic level is established for the logic inputs through pull-up resistors to the input power, preventing floating logic states on unconnected inputs. The 7.5 volt internal operating voltage raises the input voltage level sufficiently so that single external blocking diode on any control line will not interfere with the normal operation of the unit.

The desired pulse timing is selected for each channel by the appropriate selection of a timing resistor and capacitor for each channel: 3R10 and 3C4 for one channel and 3R12 and 3C5 for the other channel. Mono-stable multi-vibrator 3U1 is the primary timing circuit control that responds to the logic inputs TR1, TR2, /RESET1, /RESET2 as described in TABLE I. Both TR1 and TR2 may be configured as either a negative (High to Low) or Positive (Low to High) signal by addition or removal of the appropriate zero ohm jumpers (R1, R2, R3 and R4). Either the Q or /Q outputs of each output channel of mono-stable multi-vibrator 3U1 may be routed to the corresponding output by the selection of the appropriate jumpers (3R26, 3R27, 3R28 and 3R29). The outputs from mono-stable multi-vibrator U1 drives the /NORMALLY OPEN output metal-oxide-semiconductor field effect transistors (MOSFETS) 3Q1 and 3Q2. The select ability of the Q or /Q output routing provides maximum flexibility by allowing either output to be active High (normally low with a high impedance during pulse) or active Low (normally high impedance with ground applied during an active pulse).

Each logic output 3K2 and 3K4 from the pulse timer interface module 200 includes a power MOSFET and an output filter designed to protect each output device from transients and overload conditions. Each of the MOSFETs 3Q1 and 3Q2 are rated at 4 ampere (A) at 45 VDC, with both voltage and current parameters chosen to be substantially greater than operational requirements. Transient protection for the MOSFETs is provided by impedances 3Z1 and 3Z2, with a breakdown voltage of 39 VDC. Overload protection is provided by fuses 3F1 and 3F2. In order to provide the highest possible reliability, each logic output has been derated to a maximum operating current of 1.0 ampere.

Figure 4:
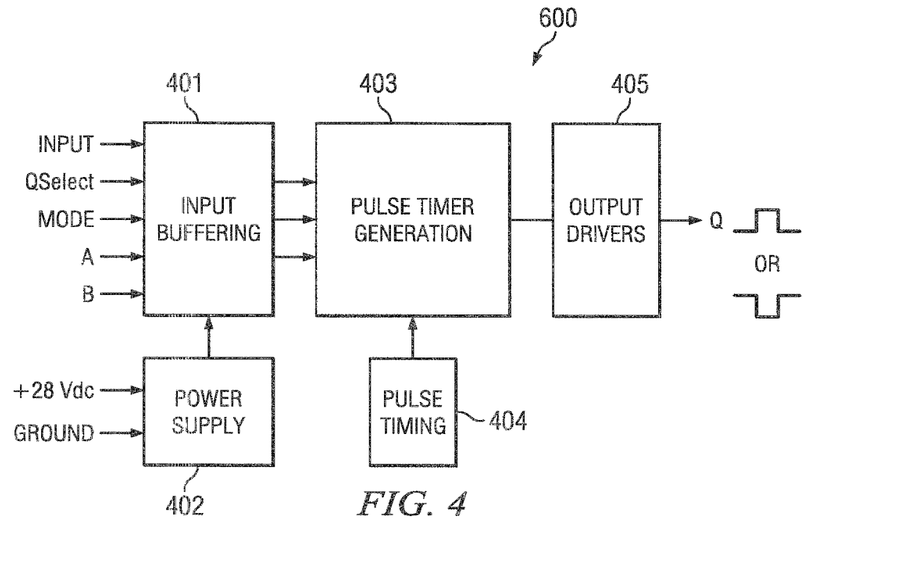
FIG. 4 is a high level functional block diagram of an embedded pulse selectable timer interface module within the pushbutton illuminated switch of FIGS. 1A-1C, contained within electronic module 111.
Figure 5:
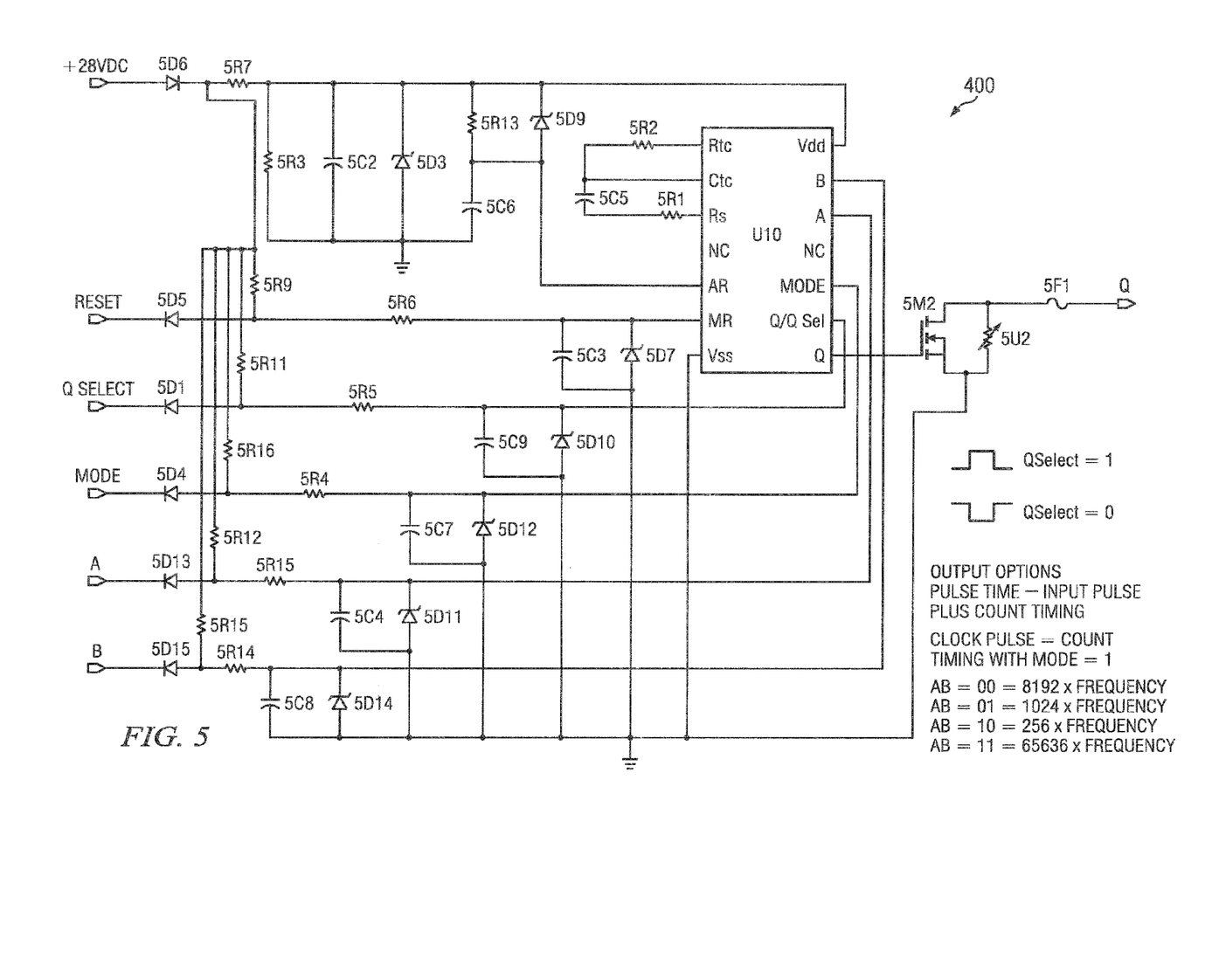
FIG. 5 is a circuit diagram for the embedded configurable pulse timer interface module of FIG. 4.

FIG. 4 is a high level functional block diagram of an embedded pulse selectable timer interface module within the pushbutton illuminated switch of FIGS. 1A-1C, contained within electronic module 111. FIG. 5 is a circuit diagram for the embedded configurable pulse timer interface module of FIG. 4. Electronic circuitry 400 within the pulse selectable timer interface module includes several functional units: input buffering unit 401; logic power supply unit 402; pulse timer generation unit 403; pulse timing unit 404; and output drivers unit 405.

A pulse selectable timer interface module contained within an illuminated pushbutton switch provides a number of benefits over traditional illuminated pushbutton switches and timed relays by combining the functions into one unit. The pulse selectable timer interface module can replace traditional electro-mechanical hold relays with an internal timed output, used in multiple ways such as to provide timed illumination to the illuminated push button switch or driving an external device such as a horn or buzzer. In addition, the pulse selectable timer interface module enables a latched condition to provide a momentary pulsed output, a capability that allows either a local or remote latching of a steady state alternate action switch type switch to generate a pulsed time output on any positive or negative level transition. The electronic nature of the pulse timer provides the additional feature of remote disable or reset using the reset inputs. The reset will cancel the output pulse if the pulse has been initiated, which is especially useful for long timing pulses or when an instantaneous override is desired of an initiated function such as canceling or shutting off of a warning buzzer.

TABLE III below contains the pulse timer logic signals and functions for the pulse selectable timer interface module of FIG. 4, while TABLE IV describes the logic input and output functions:

TABLE III

| SIGNAL NAME | 4-POLE HOUSING PIN | LOGIC FUNCTION | COMMENTS |
|---|---|---|---|
| RESET | J1 | Input: Resets and disables pulse outputs when held high. Low - Timer is operational. | |
| Trigger | J2 | High to low initiates or restarts timing pulse | |
| Q Select | J3 | Low = Output low going high during pulse High = output high and goes low during pulse | High = high impedance open drain output Low = Ground |
| A | K3 | See frequency selection table, TABLE IV below | |
| B | K4 | | |
| +28 VDC | J4 | Power | |
| Ground | K1 | Ground | |
| M2 | K2 | Output: H: Default = grounded. Becomes high impedance for length of pulse L: Default = high impedance. Becomes grounded for length of pulse | |

TABLE IV

| A | B | Number of count stages | Count $2^n$ (X frequency) |
|---|---|---|---|
| 0 | 0 | 13 | 8192 |
| 0 | 1 | 10 | 1024 |
| 1 | 0 | 8 | 256 |
| 1 | 1 | 16 | 65536 |

The pulse selectable timer interface module 400 has a total of eight (8) interface pins, five logic inputs TRIGGER, A, B, MODE and RESET and one devoted to logic output M2. Two additional interface pins are devoted to power: +28 VDC and Ground. The logic power supply for timer integrated circuit 5U10 is provided by a zener shunt regulator D3 from the +28 VDC power input. Due to the low operating current of the CMOS circuitry, a current limiting resistor 5R7 has been assigned the value of 10 KΩ in order to limit the current of any EMC or voltage transient on the +28 VDC power pin. Transient suppression and voltage regulation on the +7.5 VDC logic power supply is provided by diode and capacitor filtering of input and logic transients. Because the logic power supply is a simple shunt voltage regulator, the pulse selectable timer interface module 400 can operate over a wide input voltage range from below +10 VDC to in excess of +30 VDC.

Each logic input to the pulse selectable timer interface module 400 includes input filter circuitry designed to protect the integrated circuits from EMC, voltage transients, electromechanical contact bounce and shift the 28 VDC logic level to a 7.5 VDC logic level. The EMC protection, voltage transient protection and logic level shift function is accomplished with resistors and zener diodes. Furthermore, CMOS latch-up on extreme transients such as lightning or conducted EMP is prevented by clamping the Logic Inputs 0.5 VDC below the logic power supply voltage. Suppression of electromechanical contact bounce is provided by resistor capacitor time constant on all inputs. RESET Input time constants also guarantees a default power-up state for timer 5U10 because the power-up time constant of these components is substantially longer than that of both the logic power supply and TRIGGER, a default static logic level is established for the logic inputs through pull-up resistors to the input power, preventing floating logic states on unconnected inputs. The 7.5 volt internal operating voltage raises the input voltage level sufficiently so that single external blocking diodes in any control line will not interfere with the normal operation of the unit.

The pulse selectable timer interface module 400 includes a timer integrated circuit U10 (e.g., 14541B) that consists of a binary counter and an internal oscillator with functional operation as described in TABLE III and connected as shown in FIG. 5. The desired pulse timing is selected by a combination of the value of pins A and B (see TABLES III and IV for details) and the appropriate selection of a timing resistor and capacitor. This timing resistor and capacitor set the frequency of the internal oscillator. Timer U10 is the primary timing circuit control that responds to the inputs as defined in TABLE III.

The logic output from the pulse selectable timer interface module 400 includes a power MOSFET 5M2 and an output filter designed to protect the output device from transients and overload conditions. The MOSFET M2 is rated at 4 ampere at 45 VDC, with both voltage and current parameters chosen to be substantially greater than operational requirements. Transient protection for the MOSFET is provided by variable resistance 5U2 connected across the source/drain terminals of the MOSFET 5M2 to ground, with a breakdown voltage of 39 VDC. Overload protection is provided by fuse 5F1 connected between the output terminal of MOSFET 5M2 and circuit output Q. In order to provide the highest possible reliability, the logic output has been de-rated to a maximum operating current of 1.0 ampere.

The gate of MOSFET 5M2 driving circuit output Q is connected to the output Q of timer U10. A Q/Q Sel input to timer U10 receives the input signal Q SELECT through a reverse bias connected diode 5D1 and a resistor 5R4, and is coupled to ground through reverse bias connected zener diode 5D10 and capacitor 5C9 for transient and overvoltage protection. A pull-up resistor 5R11 connects the anode of diode 5D1 to a supply voltage derived from power supply input +28VDC, at the connection between the cathode of diode 5D6 (which is connected at the anode to power supply input +28VDC) and resistor 5R7. The other end of resistor 5R7 is coupled by parallel-connected resistor 5R3, capacitor 5C2 and reverse bias connected zener diode 5D3 to ground, with a resistor 5R13 and capacitor 5C6 connected in series between the terminal of resistor 5R7 and ground, in parallel with resistor 5R3, capacitor 5C2 and zener diode 5D3. A reverse bias connected zener diode is connected in parallel with resistor 5R13, with the connection between resistor 5R13 and capacitor 5C6 connected to input AR of timer U10. The cathode of zener diode 5D9 and zener diode 5D3, along with one terminal of each of resistor 5R13, resistor 5R3, and capacitor 5C2, is connected to the power supply input Vdd of timer U10. Input Ctc of timer U10 is connected via resistor 5R2 to input Rtc of timer U10 and via series-connected capacitor 5C5 and resistor 5R1 to input Rs of timer U10.

Input MR of timer U10 is connected through resistor 5R6 and reverse bias connected diode 5D5 to the circuit terminal RESET, with a pull-up resistor 5R9 coupling the node between diode 5D5 and resistor 5R5 to the node between diode 5D6 and resistor 5R7 and with transient and overvoltage protection to ground provided by capacitor 5C3 and reverse bias connected zener diode 5D7. Likewise control input MODE of timer U10 is connected through resistor 5R4 and reverse bias connected diode 5D4 to the circuit terminal MODE, with a pull-up resistor 5R16 coupling the node between diode 5D4 and resistor 5R4 to the node between diode 5D6 and resistor 5R7 and with transient and overvoltage protection to ground provided by capacitor 5C7 and reverse bias connected zener diode 5D12.

Circuit inputs A and B are connected to timer inputs A and B, respectively, through reverse bias connected diode 5D13 and resistor 5R15, and through reverse bias connected diode 5D15 and resistor 5R14. Pull-up resistor 5R12 couples the node between diode 5D13 and resistor 5R15 to the node between diode 5D6 and resistor 5R7, and transient and overvoltage protection to ground is provided by capacitor 5C4 and reverse bias connected zener diode 5D11. Likewise pull-up resistor 5R15 couples the node between diode 5D15 and resistor 5R14 to the node between diode 5D6 and resistor 5R7, and transient and overvoltage protection to ground is provided by capacitor 5C8 and reverse bias connected zener diode 5D14.

Figure 6:
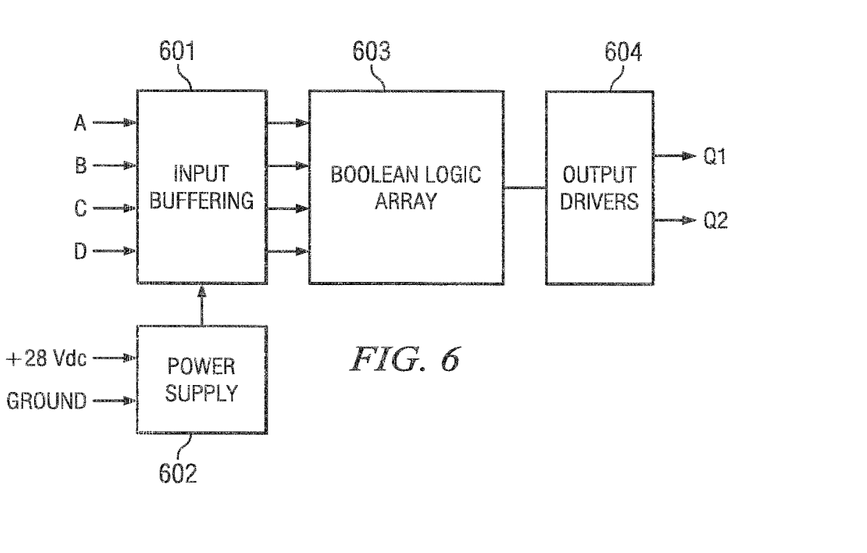
FIG. 6 is a high level functional block diagram of an embedded universal logic interface module within the pushbutton illuminated switch of FIGS. 1A-1C, contained within electronic module 111.
Figure 7:
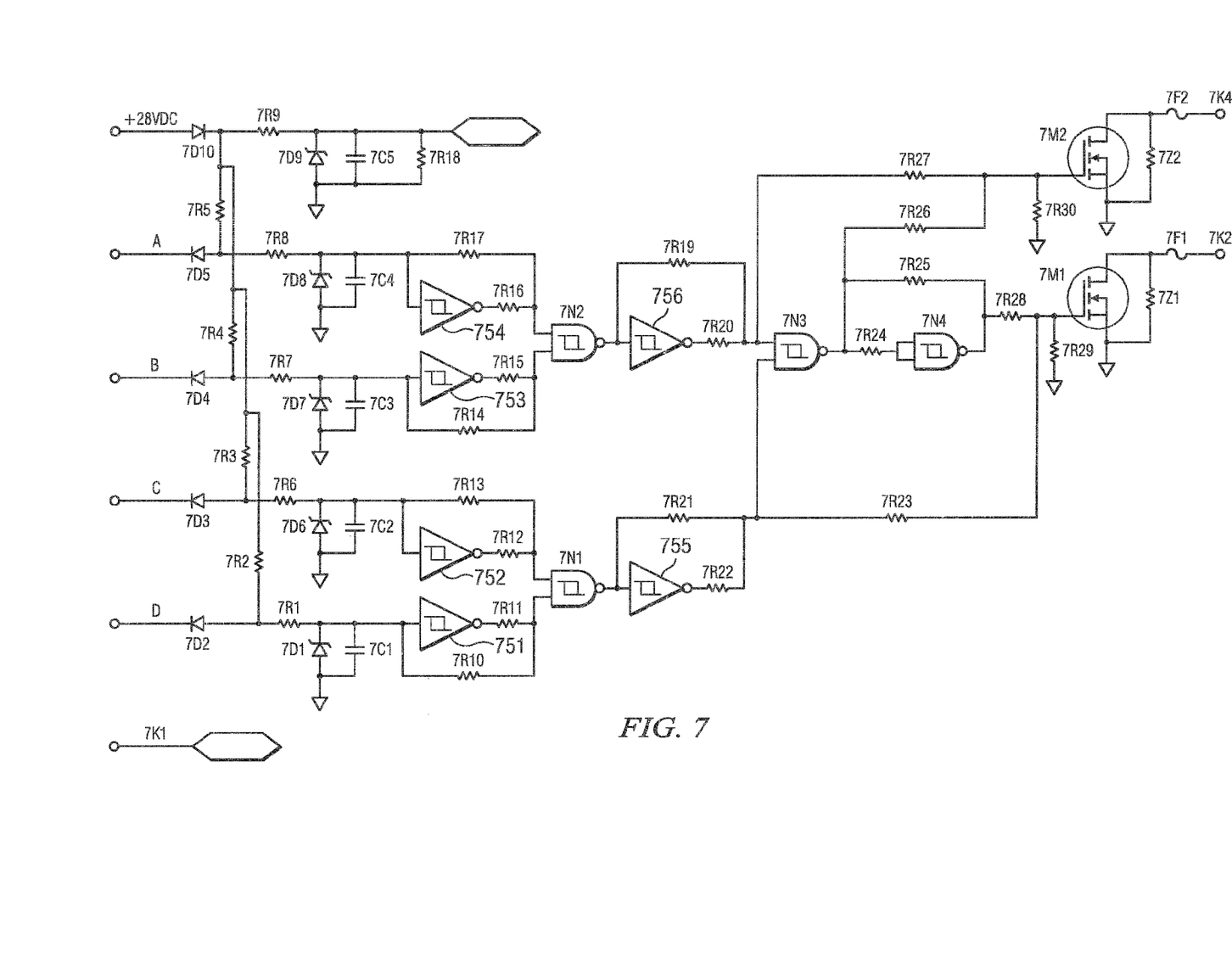
FIG. 7 is a circuit diagram for the embedded universal logic interface module of FIG. 6.

FIG. 6 is a high level functional block diagram of an embedded universal logic interface module within the pushbutton illuminated switch of FIGS. 1A-1C, contained within electronic module 111. FIG. 7 is a circuit diagram for the embedded universal logic interface module of FIG. 6. Electronic circuitry 600 within the universal logic interface module includes several functional units: input buffering unit 601; logic power supply unit 602; Boolean logic array unit 603; and output drivers unit 604.

A universal logic interface module contained within an illuminated pushbutton switch provides a number of benefits over traditional illuminated pushbutton switches, combining normally external logic functions with the illuminated push button switch into one unit. This combination of a Boolean logic with the illuminated pushbutton switch can replace traditional electro-mechanical relays and diode logic with an internal module, and may be used in multiple ways such as to provide conditional logic for illumination of the local switch or to drive external devices such as a remote switch, a horn or a remote unit. The capability allows either a local or remote input to utilize the conditional Boolean logic contained within the switch, enhancing the overall switch functionality. In addition, the universal logic interface module can also be used to invert the logic of any signal, a capability traditionally performed using an external relay. The resulting combined switch and, electronics permit elimination of the external relay and associated wiring, saving weight and improving the overall reliability of the application.

TABLE V below contains the logic signals and functions for the universal logic interface module of FIG. 6, while TABLE VI describes the Boolean logic capability and TABLE VII describes the Boolean logic functions that may be implemented with 4 logic inputs and one logic output:

TABLE V

| SIGNAL NAME | 4-POLE HOUSING PIN | LOGIC FUNCTION | COMMENTS |
|---|---|---|---|
| A | J1 | Boolean logic input | See TABLES VI and VII below |
| B | J2 | Boolean logic input | See TABLES VI and VII below |
| C | J3 | Boolean logic input | See TABLES VI and VII below |
| D | K3 | Boolean logic input | See TABLES VI and VII below |
| +28 VDC | J4 | Power | |
| Ground | K1 | Ground | |
| Q1 | K2 | Output: H: high impedance L: ground | Value is based on logic selected and value of inputs A, B, C and D |
| Q2 | K4 | /Q1 | |

TABLE VI

| A | B | AND | NAND | OR | NOR | /A AND B | /A NAND B | /A OR B | /A NOR B | XOR | XNOR |
|---|---|---|---|---|---|---|---|---|---|---|---|
| 0 | 0 | 0 | 1 | 0 | 1 | 0 | 1 | 1 | 0 | 0 | 1 |
| 0 | 1 | 0 | 1 | 1 | 0 | 1 | 0 | 1 | 0 | 1 | 0 |
| 1 | 0 | 0 | 1 | 1 | 0 | 0 | 1 | 0 | 1 | 1 | 0 |
| 1 | 1 | 1 | 0 | 1 | 0 | 0 | 1 | 1 | 0 | 0 | 1 |

| C | D | AND | NAND | OR | NOR | /C AND D | /C NAND D | /C OR D | /C NOR D | XOR | XNOR |
|---|---|---|---|---|---|---|---|---|---|---|---|
| 0 | 0 | 0 | 1 | 0 | 1 | 0 | 1 | 1 | 0 | 0 | 1 |
| 0 | 1 | 0 | 1 | 1 | 0 | 1 | 0 | 1 | 0 | 1 | 0 |
| 1 | 0 | 0 | 1 | 1 | 0 | 0 | 1 | 0 | 1 | 1 | 0 |
| 1 | 1 | 1 | 0 | 1 | 0 | 0 | 1 | 1 | 0 | 0 | 1 |

TABLE VII

| A | B | C | D | AND | OR | NAND | NOR |
|---|---|---|---|---|---|---|---|
| 0 | 0 | 0 | 0 | 0 | 0 | 1 | 1 |
| 0 | 0 | 0 | 1 | 0 | 1 | 1 | 0 |
| 0 | 0 | 1 | 0 | 0 | 1 | 1 | 0 |
| 0 | 0 | 1 | 1 | 0 | 1 | 1 | 0 |
| 0 | 1 | 0 | 0 | 0 | 1 | 1 | 0 |
| 0 | 1 | 0 | 1 | 0 | 1 | 1 | 0 |
| 0 | 1 | 1 | 0 | 0 | 1 | 1 | 0 |
| 0 | 1 | 1 | 1 | 0 | 1 | 1 | 0 |
| 1 | 0 | 0 | 0 | 0 | 1 | 1 | 0 |
| 1 | 0 | 0 | 1 | 0 | 1 | 1 | 0 |
| 1 | 0 | 1 | 0 | 0 | 1 | 1 | 0 |
| 1 | 0 | 1 | 1 | 0 | 1 | 1 | 0 |
| 1 | 1 | 0 | 0 | 0 | 1 | 1 | 0 |
| 1 | 1 | 0 | 1 | 0 | 1 | 1 | 0 |
| 1 | 1 | 1 | 0 | 0 | 1 | 1 | 0 |
| 1 | 1 | 1 | 1 | 1 | 1 | 0 | 0 |

The universal logic interface module 600 has a total of eight (8) interface pins, four devoted to logic inputs A, B, C and D and two devoted to logic outputs Q1 and Q2. Two additional interface pins are devoted to power: +28 VDC and Ground.

The logic power supply for the logic circuits is provided by a zener shunt regulator from the +28 VDC power input. Due to the low operating current of the CMOS circuitry, current limiting resistor has been assigned the value of 10K in order to limit the current of any EMC or voltage transient on the +28 VDC power pin. Transient suppression and voltage regulation on the +7.5 VDC logic power supply is provided by diode and capacitor filtering of input and logic transients. Because the logic power supply is a simple shunt voltage regulator, the universal logic interface module 600 can operate over a wide input voltage range from below +10 VDC to in excess of +30 VDC.

Each logic input to the universal logic interface module 600 includes input filter circuitry designed to protect the integrated circuits from EMC, voltage transients, electromechanical contact bounce and shift the 28 VDC logic level to a 7.5 VDC logic level. The EMC protection, voltage transient protection and logic level shift function is accomplished with resistors and zener diodes. Furthermore, CMOS latch-up on extreme transients such as lightning or conducted EMP is prevented by clamping the logic inputs 0.5 VDC below the logic power supply voltage. Suppression of electromechanical contact bounce is provided by resistor capacitor time constant on all inputs. A default static logic level is established for the Logic Inputs through pull-up resistors to the input power, preventing floating logic states on unconnected inputs. The 7.5 volt internal operating voltage raises the input voltage level sufficiently so that single external blocking diodes in any control line will not interfere with the normal operation of the unit.

The universal logic interface module 600 includes NAND gate and inverter integrated circuits 5U11 and 5U12. The functional operation of universal logic interface module 600 is described in TABLE V and universal logic interface module 600 is connected as shown in FIG. 7. The ground input 7K1 (corresponding to input K1 in FIG. 6) provides a terminal for selective jumper connections to ground. The power supply voltage input +28VDC (corresponding to circuit input J4 in FIG. 6) is connected by forward bias connected diode 7D10 to resistor 7R9, with the other terminal of resistor 7R9 connected to ground through parallel connected resistor 7R18, capacitor 7C5 and reverse bias connected zener diode 7D9. The node connected to that terminal of resistor 7R9 provides a terminal for selective jumper connections to a logic high voltage (e.g., +5VDC). Each of circuit inputs A, B, C and D are connected to the cathode of a diode 7D5, 7D4, 7D3 and 7D2, respectively, with the anode of each of those diodes connected to the cathode of diode 7D10 by a pull-up resistor 7R5, 7R4, 7R3 and 7R2 respectively. The anode of diode 7D5 is connected to one terminal of a resistor 7R8, the other terminal of which is connected to ground through parallel connected capacitor 7C4 and reverse bias connected zener diode 7D8. The anode of diode 7D4 is connected to one terminal of a resistor 7R7, the other terminal of which is connected to ground through parallel connected capacitor 7C3 and reverse bias connected zener diode 7D7. The anode of diode 7D3 is connected to one terminal of a resistor 7R6, the other terminal of which is connected to ground through parallel connected capacitor 7C2 and reverse bias connected zener diode 7D6. The anode of diode 7D2 $1s$ connected to one terminal of a resistor 7R1, the other terminal of which is connected to ground through parallel connected capacitor 7C1 and reverse bias connected zener diode 7D1.

The signal from circuit input A (corresponding to circuit input J1 in FIG. 6), after passing through diode 7D5 and resistor 7R8, is input to inverter 754 and to one terminal of resistor 7R17. The output of inverter 754 is connected to one terminal of resistor 7R16, the other terminal of which is connected, together with the second terminal of resistor 7R17, to a first input of NAND gate 7N2. Likewise the signal from circuit input B (corresponding to circuit input J2 in FIG. 6), after passing through diode 7D4 and resistor 7R7, is input to inverter 753 and to one terminal of resistor 7R14. The output of inverter 753 is connected to one terminal of resistor 7R15, the other terminal of which is connected, together with the second terminal of resistor 7R14, to a second input of NAND gate 7N2.

The signal from circuit input C (corresponding to circuit input J3 in FIG. 6), after passing through diode 7D3 and resistor 7R6, is input to inverter 752 and to one terminal of resistor 7R13. The output of inverter 752 is connected to one terminal of resistor 7R12, the other terminal of which is connected, together with the second terminal of resistor 7R13, to a first input of NAND gate 7N1. Likewise the signal from circuit input D (corresponding to circuit input K3 in FIG. 6), after passing through diode 7D2 and resistor 7R1, is input to inverter 751 and to one terminal of resistor 7R10. The output of inverter 751 is connected to one terminal of resistor 7R11, the other terminal of which is connected, together with the second terminal of resistor 7R10, to a second input of NAND gate 7N1.

The output of NAND gate 7N2 is connected to the input of inverter 756 and to one terminal of resistor 7R19, the other terminal of which is connected to resistor 7R20 that is connected in series with inverter 756, at the terminal opposite the output of inverter 756. Likewise the output of NAND gate 7N1 is connected to the input of inverter 755 and to one terminal of resistor 7R21, the other terminal of which is connected to resistor 7R22 that is connected in series with inverter 755, at the terminal opposite the output of inverter 755. The node connecting resistors 7R19 and 7R20 is connected to one input of NAND gate 7N3 and (through resistor 7R27) to the gate of MOSFET 7M2, while the node connecting resistors 7R21 and 7R22 is connected to the other input of NAND gate 7N3 and (through resistor 7R23) to the gate of MOSFET 7M2. The output of NAND gate 7N3 is connected through resistor 7R24 to both inputs to NAND gate 7N2, through resistor 7R25 to the output of NAND gate 7N4, and through resistor 7R26 to the gate of MOSFET 7M2. The output of NAND gate 7N4 is connected through resistor 7R28 to the gate of MOSFET 7M1. The gates of MOSFETs 7M2 and 7M1 are connected, through resistor 7R30 and 7R29, respectively, to ground. Impedances 7Z2 and 7Z1 are connected across the source and drain terminals of MOSFETs 7M2 and 7M1, respectively, and at one terminal to ground and at the opposite terminal through fuse 7F2 to circuit output 7K4 (corresponding to circuit output K4 in FIG. 6) and through fuse 7F1 to circuit output 7K2 (corresponding to circuit output K2 in FIG. 6), respectively.

The desired logic circuit is configured by the application and removal of zero ohm jumpers in conjunction with the NAND and inversion logic. For example, inverting the inputs to a NAND will cause the logic to be an OR. Using this technique, all basic Boolean logic can be achieved with just the inverters and NAND gates, allowing a single design to achieve maximum flexibility and be configured as needed for each application. Four input Boolean logic is also obtained by the inclusion of 2 additional NAND gates that tie the two independent channels together, which further enhances the capability of the unit.

Each logic output from the universal logic interface module 600 includes a power MOSFET and an output filter designed to protect each output device from transients and overload conditions. Each of the MOSFETs Q1 and Q2 are rated at 4 ampere at 45 VDC, with both voltage and current parameters chosen to be substantially greater than operational requirements. Transient protection for the MOSFETs is provided by Z1 and Z2, with a breakdown voltage of 39 VDC. Overload protection is provided by fuses F1 and F2. To provide the highest possible reliability, each logic output has been de-rated to a maximum operating current of 1.0 ampere.

Figure 8:
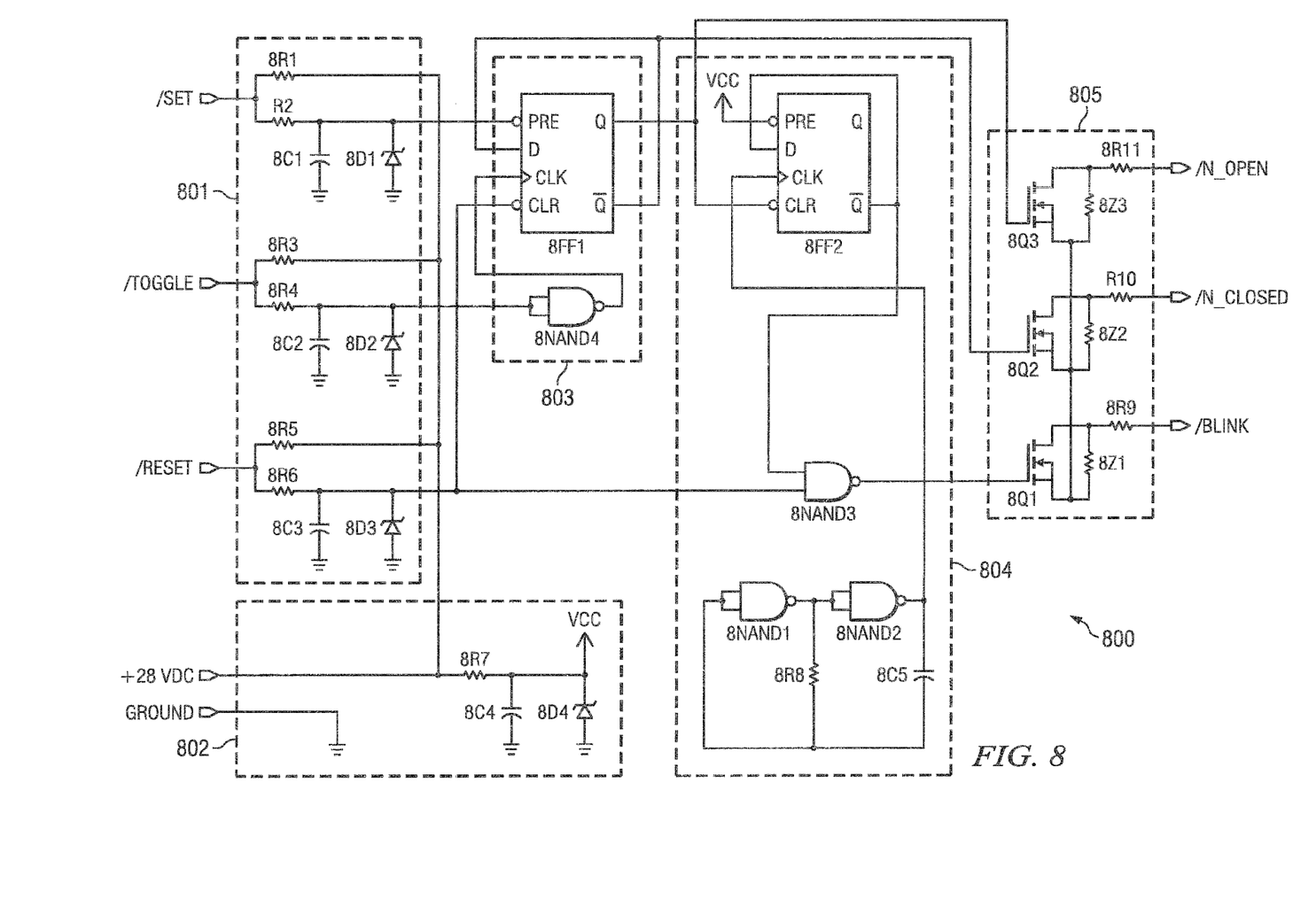
FIG. 8 is a circuit diagram for an electronic latching and/or blinking module according to one embodiment of the present disclosure.

FIG. 8 is a circuit diagram for an electronic latching and/or blinking circuit according to one embodiment of the present disclosure. Electronic latching and/or blinking circuit 800 is contained within the electronic module 111 in switch 100. TABLE VIII below contains the input and output signal descriptions for circuit 800, while TABLE IX describes the logic input and output functions:

TABLE VIII

| SIGNAL NAME | FUNCTION | ACTIVE STATE | DESCRIPTION |
|---|---|---|---|
| /RESET | Input | Low | Forces /N_OPEN to OFF (open). Forces /N_CLOSED to ON (ground). Forces /BLINK to Steady ON (ground). See Note 1 below. |
| /TOGGLE | Input | ↓ | Toggles /N_OPEN and /N_CLOSED outputs. Toggles blink mode. See Note 2 below. |

TABLE VIII-continued

| SIGNAL NAME | FUNCTION | ACTIVE STATE | DESCRIPTION |
|---|---|---|---|
| /SET | Input | Low | Forces /N_OPEN to ON (ground). Forces /N_CLOSED to OFF (open). Initiates 1 Hz blink mode to /BLINK output. |
| +28 VDC | Power | — | Power (+10 VDC to +30 VDC) |
| Ground | Common | — | Common for power and signals. |
| /N_OPEN | Output | Low | Open drain output. Forced OFF (open) by /RESET input. Forced ON (ground) by /SET input. Toggled by falling edge of /TOGGLE input. |
| /N_CLOSED | Output | Low | Open drain output. Forced ON (ground) by /RESET input. Forced OFF (open) by /SET input. Toggled by falling edge of /TOGGLE input. |
| /BLINK | Output | Low | Open drain output. Forced ON (ground) while /RESET is held low. See TABLE II below. |

TABLE IX

| Inputs | | | Outputs | | |
|---|---|---|---|---|---|
| /SET | /RESET | /TOGGLE | /N_OPEN | /N_CLOSED | /BLINK |
| L | H | X | L (ground) | H (open) | 1 Hz blink mode. |
| H | L | X | H (open) | L (ground) | |
| L | L | X | See Note 3. | See Note 3. | Steady ON. See Note 1. |
| H | H | ↓ | Toggle state. | Toggle state. | Toggle. See Note 1. |

Note 1: /BLINK output is held steady ON (ground) while /RESET is held low. /BLINK output goes OFF (open) when /RESET returns to the inactive high level. This feature provides essentially three states to the /BLINK output: OFF, ON and BLINK.

Note 2: /TOGGLE input causes /BLINK output to alternate between 1 Hertz (Hz) blink state and OFF (open).

Note 3: This is an illegal state that will have unpredictable effect upon the outputs when the inputs are returned to their normal inactive high state.

The logic input circuitry 801 for has a total of eight (8) interface pads each connected to an external pin of electronic module 111. Three interface pads are inputs: /SET, /RESET and /TOGGLE. Three interface pads are outputs: /N_OPEN (normally open), /N_CLOSED (normally closed) and /BLINK. Two additional interface pads are devoted to power: +28 VDC (volts, direct current) and Ground.

Each input pad is connected by two parallel resistors: resistors 8R1 and 8R2 for input /SET; resistors 8R3 and 8R4 for input /TOGGLE; and resistors 8R5 and 8R6 for input /RESET. One resistor of each parallel pair (8R1, 8R3 and 8R5) is connected at the one terminal to the +28 VDC input power. The other resistor of each pair (8R2, 8R4 and 8R6) is connected to one terminal of a capacitor (8C1, 8C2 and 8C3, respectively) and to the cathode of a zener diode (8D1, 8D2 and 8D3, respectively). The other capacitor terminals and the anodes of the zener diodes are connected to ground. Resistors 8R1, 8R2, 8R3, 8R4, 8R5 and 8R6 each have a resistance of 33 kilo-Ohms (KΩ). Capacitor 8C1 has a capacitance of 0.1 micro-Farads (μF) and each of capacitors 8C2 and 8C3 has a capacitance of 1.0 μF in the example depicted.

Each input to circuit 800 includes input filter circuitry designed to protect the integrated circuits from EMC, voltage transients, electromechanical contact bounce and shift the 28 VDC logic level to a 5 VDC logic level.

Resistors 8R2, 8R4 and 8R6 and zener diodes 8D1, 8D2 and 8D3 provide electromagnetic charge (EMC) protection and voltage transient protection to circuit 800, and shift the 28 VDC logic level to a 5 VDC logic level. Furthermore, complementary metal-oxide-semiconductor (CMOS) latch-up on extreme transients such as lightning or a conducted electromagnetic pulse (EMP) is prevented by clamping the inputs 0.5 VDC below the logic power supply voltage. Capacitors 8C1, 8C2 and 8C3 suppress electromechanical contact bounce. Resistors 8R5 and 8R6 and capacitor 8C3 on the /RESET input guarantee a default power-up state for circuit 800 since the power-up time constant of those components is substantially longer than that of both the logic power supply VCC (which has a lower resistance) and the /SET input (which has a much smaller capacitance). Pull-up resistors 8R1, 8R3 and 8R5 establish a default static logic level for the inputs, preventing floating logic states on unconnected inputs.

The logic power supply functional unit 802 generating the logic power supply voltage VCC for circuit 800 includes resistor 8R7 (which has a resistance of 15 KΩ), zener diode 8D4 and capacitor 8C4 (which has a capacitance of 1.0 pF) from the +28 VDC power input. Due to the low operating current of the CMOS logic circuitry within circuit 800, the value of resistor 8R7 is selected to limit the current of any EMC or voltage transient on the +28 VDC power pad. Transient suppression and voltage regulation on the +5.6 VDC logic power supply is provided by 8D4 while 8C4 provides filtering of input and logic transients. Because the logic power supply is a simple shunt voltage regulator, circuit 800 can operate over a wide input voltage range from below +10 VDC to in excess of +30 VDC.

Circuit 800 includes two high speed CMOS integrated circuits: a dual D-Type latch (FF1 and FF2) and a quad NAND gate (8NAND1, 8NAND2, 8NAND3 and 8NAND3) implementing the latch logic 803 and the blink circuitry 804. The inverted preset input PRE of latch 8FF1 is connected by resistor 8R1 to the /SET input, while the input D of latch 8FF1 is connected to the inverting output of latch 8FF1. The clock input CLK of latch 8FF1 is coupled by NAND gate 8NAND4, configured as an inverter with the inputs tied together, by resistor 8R4 to the /TOGGLE input. The inverted clear input CLR of latch 8FF1 is connected by resistor 8R6 to the /RESET input.

Latch 8FF1 is the primary latching circuit that responds to the inputs /SET, /RESET and /TOGGLE as described in TABLE II above. NAND gate 8NAND4 is connected between the /TOGGLE input and the clock input of latch 8FF1 for the purpose of inverting the positive (leading) edge trigger of latch 8FF1 to a negative (trailing) edge trigger. The inverting output of latch 8FF1 is connected to the D input so that successive /TOGGLE inputs to latch 8FF1 result in a toggling action of latch 8FF1 non-inverting and inverting outputs Q and /Q. The non-inverting output Q from latch 8FF1 drives the normally open output /N_OPEN via n-channel enhancement mode metal-oxide-semiconductor field effect transistor (MOSFET) 8Q3, and the inverting output /Q from latch FF1 drives the normally closed output /N_CLOSED via MOSFET 8Q2. The non-inverting output Q of latch 8FF1 also holds latch 8FF2 in the reset state any time latch 8FF1 is in the reset state.

Blink circuitry 804 includes series connected NAND gates 8NAND1 and 8NAND2 configured as inverters with the respective inputs tied together and are interconnected as a dual inverting buffer that, together with resistor 8R8 (having a resistance of 220 KΩ) connecting a feedback loop from the output of NAND gate 8NAND2 to the input of NAND gate 8NAND1 with the input to NAND gate 8NAND2 and capacitor 8C5 (having a capacitance of 1.9 µF) connected in the feedback loop, form a free running square wave oscillator with a fundamental frequency $F=1/(2.2\times 8R8\times 8C5)$ of approximately 2 Hertz (Hz). The output of that oscillator feeds the clock input CLK of 8latch FF2, where the inverting output /Q of latch FF2 is connected to the D input so that latch 8FF2 functions as f/2 frequency divider. The inverted preset input PRE of latch 8FF2 is tied to the logic supply voltage VCC. Because the inverted clear input CLR of latch 8FF2 is connected to the non-inverting output Q of latch 8FF1, the f/2 divider circuit is effectively disabled any time latch 8FF1 is in the reset state. The f/2 divided frequency output of latch 8FF2 creates the 1 Hz blink mode oscillator, enabled only when latch 8FF2 is in the set state.

The enabled 1 Hertz blink signal from the inverting output /Q of latch 8FF2 is connected, along with the filtered /RESET input, each to one input of NAND gate 8NAND3. NAND gate 8NAND3 thus serves as blink logic, forcing the /BLINK output to be held in a steady ON state any time the /RESET input signal is held low. The output of NAND gate 8NAND3 is connected to MOSFET 8Q1 to provide the /BLINK output of circuit 800.

Each output from the circuit 800 includes a power MOSFET 8Q1, 8Q2 or 8Q3 each rated at 2.5 ampere (A) at 45 VDC (both parameters chosen to be substantially greater than operational requirements) and an output filter designed to protect each output device from transients and overload conditions. Transient protection for the MOSFETs 8Q1, 8Q2 and 8Q3 is provided by impedances 8Z1, 8Z2 and 8Z3, each having a breakdown voltage of 39 VDC. Overload protection is provided by resettable Positive Temperature Coefficient (PTC) resistors 8R9, 8R10 and 8R11 with a holding current of 0.5 A at elevated temperatures. These devices perform the function of a fuse, limiting current in the event of a short or overload, but automatically return to their normal state when the short or overload is removed. In order to provide the highest possible reliability, each output /N_OPEN, /N_CLOSED and /BLINK is derated to a maximum operating current of 0.5 A.

The features of activating switch functions from a remote location, energizing or blinking a local or remote display, resetting the switch state automatically upon remote acknowledgement, changing the state of a switch or display at one location based on another, remote switch controlling the same function being depressed, and automatic reset to a default state after loss of power are implemented in the present disclosure by replacing the traditional electromagnetic holding coil within the illuminated pushbutton switch housing with a subminiature electronic logic module. The logic module provides many additional features beyond the simple latching or on/off toggling functionality that is typical of an electromagnetic holding coil, including lower size and weight, longer switch life, no electrical spikes, remote set and reset capability, display blinking, and high reliability electronic driver circuits that can drive modest electrical loads.

Although the above description is made in connection with specific exemplary embodiments, various changes and modifications will be apparent to and/or suggested by the present disclosure to those skilled in the art. It is intended that the present disclosure encompass all such changes and modifications as fall within the scope of the appended claims.

What is claimed is:

1. A circuit for an illuminating pushbutton switch comprising:
an electronic module fitting within a space in the illuminating pushbutton switch housing sufficient to accommodate two snap-action switches, the electronic module comprising one of a configurable pulse timer interface module, a pulse selectable timer interface module, and a universal logic interface module.

2. The circuit of claim 1, wherein the electronic module comprises a configurable pulse timer interface module, the configurable pulse timer interface module comprising:
an input buffer configured to receive one or more trigger signals;
an edge detection and pulse generation circuit configured to produce, in response to one of the one or more trigger signals, a pulse of selectable timing relative to an edge of the one trigger signal, of selectable orientation, and of selectable duration; and
one or more pulse timing control circuits for setting the selectable timing, orientation and duration of pulses produced by the edge detection and pulse generation circuit.

3. The circuit of claim 2, wherein the edge detection and pulse generation circuit is configured to produce pulses on two channels.

4. The circuit of claim 2, wherein the selectable orientation comprises one of active high and active low.

5. The circuit of claim 2, wherein the edge detection and pulse generation circuit comprises a mono-stable multi-vibrator.

6. The circuit of claim 1, wherein the electronic module comprises a pulse selectable timer interface module, the pulse selectable timer interface module comprising:
an input buffer configured to receive a trigger signal;
a pulse timer generation circuit configured to produce, in response to the trigger signal, a pulse at a selectable time relative to an edge of the trigger signal; and
a pulse timer control circuit for setting the selectable time based on one or more control inputs to the pulse selectable timer interface module.

7. The circuit of claim 6, wherein the selectable time is one of a plurality of predetermined numbers of clock cycles.

8. The circuit of claim 6, wherein the pulse timer generation circuit comprises a binary counter and an internal oscillator.

9. The circuit of claim 1, wherein the electronic module comprises a universal logic interface module, the universal logic interface module comprising:
an input buffer configured to receive a plurality of logic input signals; and
a logic array configured to produce a selected logic result based on at least two of the logic input signals.

10. The circuit of claim 9, wherein the selected logic result is selected from AND, NAND, OR, NOR, XOR and XNOR.

11. A method of operating an illuminating pushbutton switch, comprising:
providing power to an electronic module fitting within a space in the illuminating pushbutton switch housing sufficient to accommodate two snap-action switches, the electronic module comprising one of a configurable pulse timer interface module, a pulse selectable timer interface module, and a universal logic interface module; and employing the electronic module during operation of the illuminating pushbutton switch.

12. The method of claim 11, wherein the electronic module comprises a configurable pulse timer interface module, the method further comprising:

receiving one or more trigger signals at an input buffer;

producing, in response to one of the one or more trigger signals, a pulse of selectable timing relative to an edge of the one trigger signal, of selectable orientation, and of selectable duration; and setting the selectable timing, orientation and duration of pulses produced by the edge detection and pulse generation circuit.

13. The method of claim 12, further comprising producing pulses on two channels.

14. The method of claim 12, wherein the selectable orientation comprises one of active high and active low.

15. The method of claim 12, further comprising utilizing a mono-stable multi-vibrator to produce the pulse.

16. The method of claim 11, wherein the electronic module comprises a pulse selectable timer interface module, the method further comprising:

receiving a trigger signal at an input buffer;

producing, in response to the trigger signal, a pulse at a selectable time relative to an edge of the trigger signal; and setting the selectable time based on one or more control inputs.

17. The method of claim 16, wherein the selectable time is one of a plurality of predetermined numbers of clock cycles.

18. The method of claim 16, further comprising utilizing a binary counter and an internal oscillator to produce the pulse.

19. The method of claim 11, wherein the electronic module comprises a universal logic interface module, the method further comprising:

receiving a plurality of logic input signals at an input buffer; and producing a selected logic result based on at least two of the logic input signals.

20. The method of claim 19, wherein the selected logic result is selected from AND, NAND, OR, NOR, XOR and XNOR.

* * * * *